Patented Sept. 5, 1933

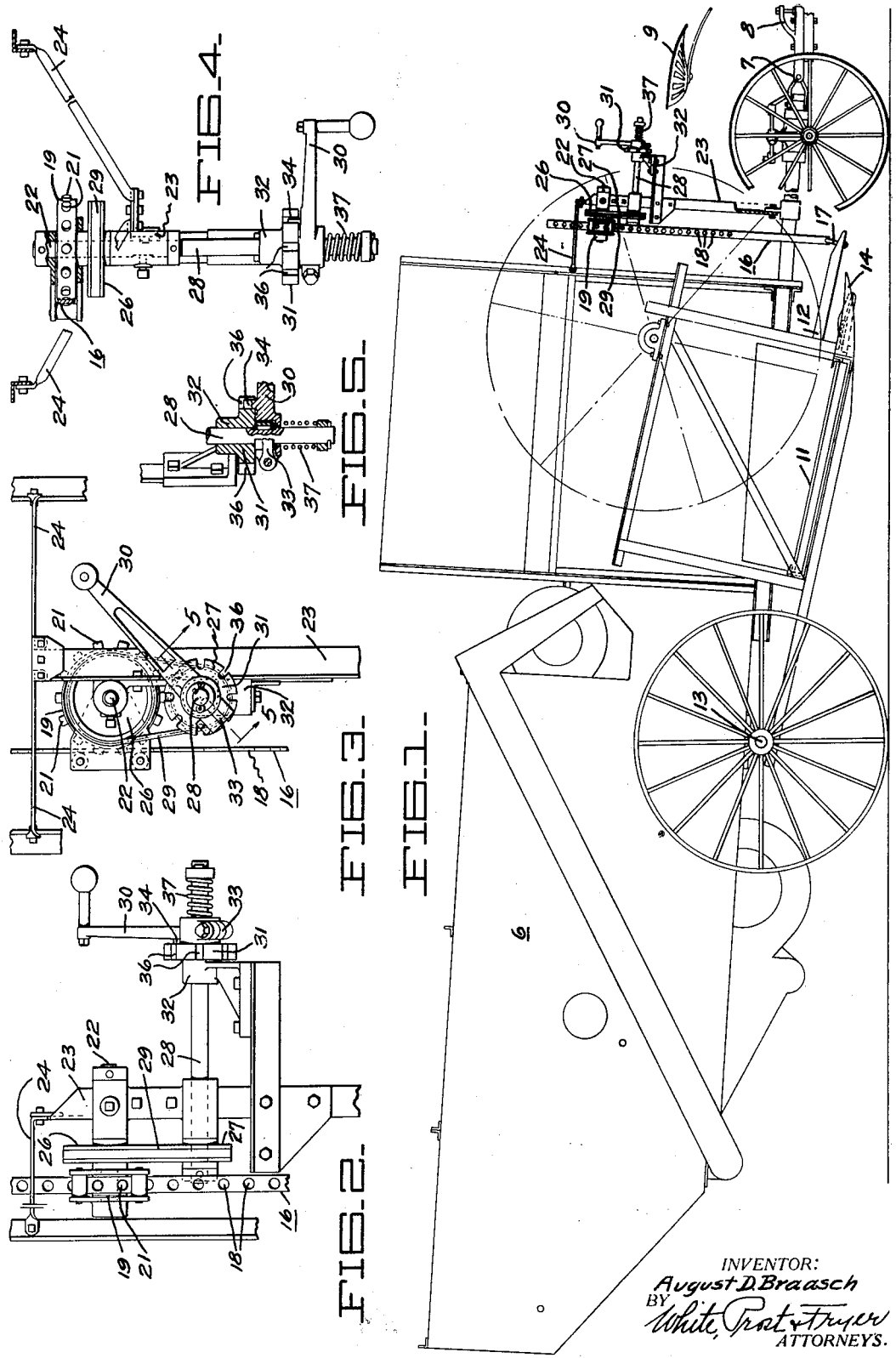

1,925,369

UNITED STATES PATENT OFFICE 1,925,369

HARVESTER

August D. Braasch, Stockton, Calif., assignor, by mesne assignments, to Caterpillar Tractor Co., San Leandro, Calif., a corporation of California Application August 14, 1928. Serial No. 299,496

19 Claims. (Cl. 56—20)

My invention relates to harvesters provided with units which must be adjusted with respect to each other and relates particularly to such mechanism including a separator unit and a header unit. A combined harvester is operated over a field of standing grain, usually of irregular contour and it is necessary to alter the height from the ground of the leading edge of the header in order to avoid obstructions and to cut the grain at the desired level.

It is customary to provide a so-called "Jacob staff", usually located near the upper central part of the separator unit, to adjust the header with respect to the separator frame. Such a Jacob staff is entirely satisfactory providing there is a man available in the harvesting crew to operate it, but it is inaccessible and difficult of manipulation when the entire harvesting crew is confined to a tractor operator as is sometimes the case. That is, it is often desirable to attach the combine to a draft vehicle such as a tractor, the operator of which is seated on the tractor immediately in advance of the combine. With such an arrangement, it is impossible for the tractor operator to change or adjust the height of the header, and it is therefore an object of my invention to provide a header adjustment of such a nature that a tractor operator, without leaving his seat on the tractor, can vary the adjustment of the header.

Another object of my invention is to provide a generally useful adjusting device which will remain in adjustment despite the jolts and jars to which harvesting machinery is customarily subjected.

An additional object of my invention is to provide an adjusting means which is easily installed on a standard type of combine without greatly altering the customary construction.

The foregoing and other objects are attained in the embodiment of the invention shown in the drawing, in which Fig. 1 is a side elevation of a harvester provided with the adjusting device of my invention.

Fig. 2 is a side elevation on an enlarged scale of the major parts of my adjusting device.

Fig. 3 is an end elevation of the mechanism disclosed in Fig. 2.

Fig. 4 is a plan of the device as shown in Fig. 2, portions being broken away to increase the clarity of the disclosure.

Fig. 5 is a section on the line 5—5 of Fig. 3.

As attached to a harvester being drawn by a draft vehicle, the adjusting device of my invention preferably comprises an adjusting crank operating thru reduction gearing to raise and lower a header, and is designed to be locked in any adjusted position and is located so that the driver or operator of the draft vehicle can manipulate the crank without leaving his customary seat.

Although the device of my invention is well applicable to a variety of environments, it is particularly well located on a combined harvester as shown. This vehicle 6 includes a draft frame 7 to the forward end of which a draft hitch 8 is secured for attachment to a draft vehicle, not shown. This draft vehicle can be of any convenient type and preferably includes a seat 9 for the operator which is located adjacent the hitch 8 and near the forward or leading end of the draft frame 7. Included in the combined harvester is a header 11 having a framework 12 mounted to pivot about the axle 13 of the combine so that its leading end 14 can be positioned at any desired height from the ground.

For adjusting the height of the header and making the adjustment accessible to an operator occupying the seat 9, I preferably secure to the framework 12 an upright rack 16 comprising a metallic strip at its lower end provided with an eyelet 17 or other flexible connection, and being pierced thruout the major portion of its length with a series of apertures. Meshing with the rack is a pinion 19 comprising a wheel having a plurality of radially projecting peripheral pegs 21 for engagement in the apertures 18. The pinion is preferably fast on a shaft 22 journalled in a support 23 mounted on the draft frame 7 and held in place by braces 24 extending to the combine 6. Upon rotation of the shaft 22, the pegs 21 on the pinion engage the apertures 18 in the rack 16 and raise or lower the header 11 depending upon the direction of rotation of the shaft.

To increase the mechanical advantage of the linkage, I preferably provide a reduction gearing. Included in the reduction gearing is a sprocket 26 mounted on the shaft 22 and an alined sprocket 27 mounted on another shaft 28 suitably journalled in the framework 23. Connecting the sprockets 26 and 27 is a chain 29 for effecting their rotation in unison. The relative diameters of the two sprockets can be fixed at any predetermined ratio so that the mechanical advantage of the gear reduction can be any amount desired. Shaft 28 is preferably extended forwardly of the machine to lie proximate the draft hitch 8 and within convenient reach of an operator occupying seat 9.

For revolving the shaft 28, I provide a crank 30 for convenient manual operation. Combined with the crank, however, there is provided means for locking the entire reversible mechanism in any selected or adjusted position. This means includes a latch to engage a stationary notched plate 31 preferably forming part of a body 32 in which the shaft 28 is journalled. The crank 30 instead of being directly affixed to a shaft 28 is preferably pivoted at one side of its center to a collar 33 fastened to the shaft. Thus the crank is not rotatable with respect to the shaft, but is movable axially therealong in an arcuate path. Projecting from the crank is a pin 34 of the proper size to seat and engage in the notches 36 cut in plate 31, so that when the pin 34 is in engagement with the disc, the crank is held nonrotatably and the entire mechanism is latched or locked in adjusted position. For insuring that normally the pin is in engagement with one of the notches 36, a coil spring 37 is placed around an extension of shaft 28 and urges the crank axially toward the plate 31.

With this arrangement, the operator of a draft vehicle who occupies seat 9, by grasping the convenient crank 30 and pulling it slightly forward to disengage the pin 34 from the notched plate, can rotate the crank in either direction to actuate the reduction gearing and by means of the rack and pinion, raise or lower the header to any desired height. Upon the completion of this operation, a release of the crank by the operator permits spring 37 to bias the crank rearwardly and lock the entire mechanism against accidental displacement.

It is to be understood that I do not limit myself to the form of the harvester shown and described herein, as the invention, as set forth in the following claims may be embodied in a plurality of forms.

I claim:

1. In a harvester, a draft frame, a header adjustable with respect to said frame, a rack connected to said header, a pinion mounted on said frame and meshing with said rack, reduction gearing connected to said pinion, a crank for operating said reduction gearing, and a latch independent of the gearing and the rack and the pinion for locking said crank in position.

2. In a harvester, a draft frame, a hitch for a draft vehicle on said frame, a header adjustable with respect to said frame, a rack on said header, a pinion mounted on said frame and meshing with said rack, reduction gearing connected to said pinion, a crank accessible to an operator of said draft vehicle for operating said reduction gearing, and means including a spring for locking said crank in position.

3. In a harvester, an adjusting mechanism comprising a first shaft, a second shaft, sprockets on each of said shafts, a chain encompassing said sprockets, a pinion on said second shaft, a rack meshing with said pinion and attached to the member to be adjusted, an axially movable crank mounted to rotate in unison with said first shaft, a relatively stationary notched plate, a pin on said crank adapted to engage said notched plate to prevent rotation of said crank, and a spring for urging said crank axially of said shaft to engage said pin with said plate.

4. The combination with a harvester having an adjustable header, and a tractor adapted to be detachably hitched to the harvester to pull the harvester, said tractor having a driver's seat adjacent the harvester, of mechanism solely on the harvester for effecting adjustment of the header, and means solely on the harvester for actuating said mechanism and positioned adjacent the seat of the tractor so as to be readily accessible to the driver thereof; said actuating means including a latch, a rotatable member adapted normally to engage said latch, mounting means for said member to allow movement thereof independent of said rotary movement whereby the member may be grasped by the driver to move it from engagement with the latch, and spring means for thrusting and holding the member in engagement with the latch.

5. The combination of a vehicle and a connected implement having an adjustable element, means on said implement for adjusting said element arranged conveniently to a vehicle operator, said adjusting means including a latch member adapted to be first moved by said operator in one direction and then rotated to adjust said element.

6. The combination of a vehicle and a connected implement having an adjustable element, means on said implement for adjusting said element arranged conveniently to a vehicle operator, said adjusting means including a latch member adapted to be first moved by said operator in one direction and then rotated to adjust said element and to lock automatically upon release by said operator.

7. The combination of a vehicle and a connected implement having an adjustable element, means for adjusting said element arranged conveniently to a vehicle operator, said adjusting means including a latch member adapted to be first moved by said operator in one direction and then rotated to adjust said element.

8. The combination of a vehicle and a connected implement having an adjustable element, means for adjusting said element arranged conveniently to a vehicle operator, said adjusting means including a latch member adapted to be first moved by said operator in one direction and then rotated to adjust said element and to lock automatically upon release by said operator.

9. The combination of a vehicle and a connected implement having an adjustable element, means on said implement for adjusting said element arranged conveniently to a vehicle operator, said adjusting means including a normally latched shaft and a member movable axially relative to said shaft by said operator to unlatch said shaft and rotatable by said operator with said shaft to adjust said element.

10. The combination of a vehicle and a connected implement having an adjustable element, means on said implement for adjusting said element arranged conveniently to a vehicle operator, said adjusting means including a normally latched shaft and a member movable axially relative to said shaft by said operator to unlatch said shaft and rotatable by said operator with said shaft to adjust said element and adapted to latch automatically upon release by said operator.

11. In a vehicle train, an adjustable element, and adjusting means therefor including a member movable in the direction of movement of said train to unlock said element for adjustment and transversely of said direction of movement to adjust said element.

12. In a vehicle train having an operator's station, an adjustable element, adjusting means therefor including a member movable toward said operator's station to unlock said element for adjustment and movable in another direction of movement to adjust said element.

13. In a vehicle train, an adjustable element, and adjusting means therefor including a member movable in the direction of movement of said train to unlock said element for adjustment, said member being movable transversely of said direction of movement to adjust said element and automatically latching said adjustable element upon movement in a direction opposite to that of the vehicle train.

14. In a vehicle train having an operator's station, an adjustable element, adjusting means therefor including a member movable in a direction of movement toward said operator's station to unlock said element for adjustment and transversely of said direction of movement to adjust said element, said member automatically latching said adjustable element upon movement in a direction away from said operator's station.

15. The combination with a draft vehicle and a second vehicle adapted to be drawn thereby, said second vehicle having an adjustable element and said draft vehicle having a driver's seat adjacent said second vehicle, of means on the second vehicle for effecting adjustment of said adjustable element, said means including a movable control member positioned adjacent the seat of the draft vehicle so as to be readily accessible to the driver thereof, means for locking said control member in a position thereof, and means for mounting the control member to allow movement thereof in one direction from said position when the control member is to be unlocked and also to allow movement in another direction for effecting the adjustment.

16. The combination with a draft vehicle and a second vehicle adapted to be drawn thereby, said second vehicle having an adjustable element and said draft vehicle having a driver's seat adjacent said second vehicle, of means on the second vehicle for effecting adjustment of said adjustable element, said means including a movable control member positioned adjacent the seat of the draft vehicle so as to be readily accessible to the driver thereof, means for locking said control member in a position thereof, means for mounting the control member to allow movement thereof in one direction from said position when the control member is to be unlocked and also to allow movement in another direction for effecting the adjustment, and resilient means for thrusting the control member to locking position.

17. In a vehicle having an adjustable element and adapted to be drawn by a draft vehicle, means on said first-mentioned vehicle for adjusting said element, comprising a rotatable shaft, a crank handle pivotally connected to and mounted for rotation with said shaft, and means for latching the handle in a pivotal position thereof.

18. In a vehicle having an adjustable element and adapted to be drawn by a draft vehicle having an operator's seat, means on said first-mentioned vehicle for adjusting said element, comprising a rotatable shaft, reduction gearing interconnected between said shaft and said element, a crank handle pivotally connected to and mounted for rotation with said shaft, said crank handle being positioned to be adjacent said operator's seat so as to be readily accessible to the operator, and means for latching the handle in a pivotal position thereof.

19. In a vehicle having an adjustable element and adapted to be drawn by a draft vehicle having an operator's seat, means on said first-mentioned vehicle for adjusting said element, comprising a rotatable shaft, reduction gearing interconnected between said shaft and said element, a crank handle pivotally connected to and mounted for rotation with said shaft, a handle latching member positioned adjacent said shaft, the handle having a member adapted to engage said latching member in a pivotal position thereof, and being movable away from said position toward said operator's seat to allow for rotation of said shaft, and resilient means for normally urging said handle to its latched position.

AUGUST D. BRAASCH.